United States Patent
Potter et al.

(10) Patent No.: US 11,442,880 B2
(45) Date of Patent: Sep. 13, 2022

(54) STORAGE DRIVE ADAPTER

(71) Applicant: HEWLETT PACKARD ENTERPRISE DEVELOPMENT LP, Houston, TX (US)

(72) Inventors: Andrew Potter, Houston, TX (US); Michael S. Bunker, Houston, TX (US); Timothy A. McCree, Houston, TX (US); Troy Anthony Della Fiora, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/226,251

(22) Filed: Apr. 9, 2021

(65) Prior Publication Data

US 2021/0224211 A1    Jul. 22, 2021

Related U.S. Application Data (63) Continuation of application No. 16/433,637, filed on Jun. 6, 2019, now Pat. No. 11,100,021, which is a (Continued)

(51) Int. Cl.
*G06F 13/38* (2006.01)
*G11B 33/12* (2006.01)
(Continued)

(52) U.S. Cl.
CPC ........ *G06F 13/385* (2013.01); *G06F 13/4072* (2013.01); *G06F 13/4282* (2013.01); *G11B 33/126* (2013.01); *G06F 2213/0028* (2013.01)

(58) Field of Classification Search
None
See application file for complete search history.

(56) References Cited

U.S. PATENT DOCUMENTS 5,340,340 A    8/1994  Hastings et al.
5,483,419 A    1/1996  Kaczeus et al.
(Continued)

FOREIGN PATENT DOCUMENTS

EP    0425176       5/1991
TW    201430840 A   8/2014

OTHER PUBLICATIONS

IBM, "Removing a Hot-Swap Storage Drive," retrieved online Sep. 9, 2014, https://publib.boulder.ibm.com/infocenter/bladectr/documentation/index.jsp?topic=/com.ibm.bladecenter.hs23.doc/removing_a_hot-swap_storage_drive.html.

*Primary Examiner* — Henry Tsai
*Assistant Examiner* — Aurangzeb Hassan
(74) *Attorney, Agent, or Firm* — Hewlett Packard Enterprise Patent Department (57) ABSTRACT

A storage drive adapter may comprise an adapter board, which may include a first and second carrier module interface to removably engage with a first and a second storage drive carrier module, respectively. The adapter board may further include a dual ported storage drive connector to engage with a complementary storage drive bay interface. The dual ported storage drive connector may include a first port to provide a first signal path from the complementary storage drive bay interface to the first carrier module interface. Similarly, the dual ported storage drive connector may also include a second port to provide a second signal path from the complementary storage drive bay interface to the second carrier module interface.

7 Claims, 4 Drawing Sheets

Related U.S. Application Data continuation of application No. 15/535,030, filed as application No. PCT/US2014/071181 on Dec. 18, 2014, now Pat. No. 10,366,030.

(51) Int. Cl.
    *G06F 13/40*    (2006.01)
    *G06F 13/42*    (2006.01)

(56) References Cited

U.S. PATENT DOCUMENTS

| | | |
|---|---|---|
| 6,445,579 B1 * | 9/2002 | Singleton, Jr. ........ G06F 1/1658 248/65 |
| 6,854,174 B2 | 2/2005 | Jiang et al. |
| 2002/0012531 A1 * | 1/2002 | Flannery ................ G11B 20/10 369/10 |
| 2003/0210900 A1 * | 11/2003 | Flannery ................ G11B 20/10 386/E5.07 |
| 2004/0193791 A1 | 9/2004 | Felton et al. |
| 2006/0047880 A1 * | 3/2006 | Lindblom ............. G06F 13/426 710/305 |
| 2009/0219948 A1 | 9/2009 | Nakajima et al. |
| 2010/0049914 A1 | 2/2010 | Goodwin |
| 2014/0310441 A1 * | 10/2014 | Klughart ............ G06F 13/4072 710/301 |
| 2015/0317272 A1 * | 11/2015 | Tanaka ................. G06F 13/385 710/301 |
| 2017/0322605 A1 | 11/2017 | Potter et al. |

* cited by examiner

STORAGE DRIVE ADAPTER

BACKGROUND

Storage drives can be used to store data from computer systems, including server systems. Further, storage drives can be used to transfer data between multiple computer systems. Storage drives may be easily installed or removed externally from computer systems, or they may also be installed in the computer system internally, making removal and installation more difficult.

Server systems generally use storage drives as part of a storage array. Server storage drives can be removable from the array without needing to shut down the server system. Such storage drives are generally removed from the front of the server system and can be coupled to a storage adapter in order to facilitate easy removal and installation of the storage drive while the server system is running.

DETAILED DESCRIPTION

Storage drives can have edge connectors that connect the storage drive to a receiving connector in an associated computing system, including a server system. The edge connectors can include multiple pins (e.g., a gold finger connector). The edge connector can include multiple signal pins, at least one ground pin, and at least one power pin. The multiple signal pins can communicate a signal to and from a memory portion of the storage drive and the receiving connector, while the at least one ground pin can connect the storage drive to ground, and the at least one power pin can provide power to the storage drive from the receiving connector. The ground and power pins may be longer than the signal pins.

Storage drives can be coupled to carrier modules to facilitate the use of the storage drive in the associated computing system. The carrier module may receive the storage drive and may also facilitate the connection between the edge connector of the storage drive and the receiving connector. Server systems can have multiple storage drives, each drive being separately accessible from the front of the server, and each drive having the ability to be removably connected to the system without the function of the system being stopped (e.g., each drive can be hot plugged).

The ability to hot plug a storage drive into the server system depends on the storage drive being directly insertable into the server system from the front, such that the longer ground and power pins on the storage drive's edge connector can interface with the server system's receiving connector before the signal pins on the edge connector interface with the receiving connector. This allows the storage drive to be in electrical communication with both a ground connection and a power connection before the storage drive begins to receive a signal from the server system through the signal pins.

Generally, server systems receive storage drives in storage drive bays within the server system, each storage drive bay having a receiving connector and generally receiving only one storage drive. Thus, the server system is often limited to receiving only the same number of storage drives as it has storage bays. It is generally advantageous to increase the number of storage drives in a server system. Some server systems have a limited number of storage drive bays and increasing the number of storage drive bays may be cost prohibitive or limited by physical space or other practical matters. A storage bay within a server system may be able to mechanically receive multiple storage drives that are smaller than the storage bay, however, each of the separate storage drives within the storage drive bay generally requires a separate connection to the server system.

Additionally, server systems often employ a Redundant Array of Independent Disks (RAID) storage system when utilizing multiple storage drives. A RAID system can provide data redundancy and performance improvement for the server system. RAID systems are often classified into different levels. Generally, for example, server systems that only have two storage drive bays are limited to employing a RAID level 0 or RAID level 1 storage system. RAID level 0 can provide a storage system with good performance. Conversely, RAID level 1 can provide a storage system with good redundancy and reliability. A RAID level 5 storage system can provide both good performance and good redundancy, but requires the server system to have at least three storage drives.

In contrast, implementations of the present disclosure can provide a carrier module adapter that can mechanically engage multiple storage drives with the same storage drive bay. This allows a server system to increase the storage density available to it without increasing the number of storage drive bays. Additionally, implementations of the present disclosure can provide a carrier module adapter that can engage multiple storage drives or storage drive carrier modules with a single storage drive bay receiving connector. Further, implementations of the present disclosure can provide a way to broaden the number of RAID levels a server system can utilize by increasing the number of available storage drives.

Figure 1:
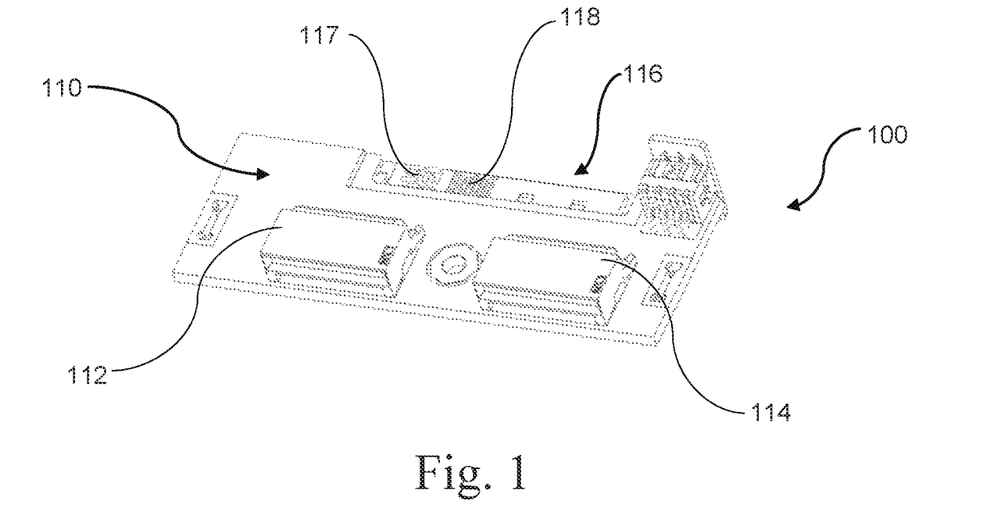
FIG. 1 is a perspective view of an example storage drive adapter including an adapter board, a first and second carrier module interface, and a dual ported storage drive connector.

Referring now to FIG. 1, an example storage drive adapter 100 is illustrated. The storage drive adapter 100 may include an adapter board 110. The adapter board 110 may include a first carrier module interface 112, a second carrier module interface 114, and a dual ported storage drive connector 116. The dual ported storage drive connector 116 may include a first port 117 and a second port 118.

The adapter board 110 may structurally support and electrically connect multiple electronic components. The adapter board 110 may, in some implementations, electrically connect multiple electronic components with conductive pathways. In further implementations, the adapter board 110 may comprise a non-conductive substrate with copper conductive pathways etched onto the substrate. In some implementations, the non-conductive substrate may include silicone. In further implementations, the adapter board 110 may comprise a single-layer printed circuit board (PCB), or a multi-layer PCB in other implementations.

As illustrated in FIG. 1, the adapter board 110 may include a first and second carrier module interface 112 and 114, respectively, coupled to the adapter board 110. The first and second carrier module interfaces 112 and 114 may each be electrical interfaces to engage with an edge connector. In some implementations, the first and second carrier module interfaces 112 and 114 may each engage with an edge connector comprising multiple pins. In further implementations, the first and second carrier module interfaces 112 and 114 may be a Serial Attached Small Computer System Interface (SAS) connector. In further implementations, the first and second carrier module interfaces 112 and 114 may be Mini SAS connectors. In yet further implementations, the first and second carrier module interfaces 112 and 114 may be 26-pin SFF-8086 Mini SAS connectors.

The first and second carrier module interfaces 112 and 114 may each removably engage with an edge connector of a first and second storage drive, respectively. In some implementations, the first and second carrier module interfaces 112 and 114 may each removably engage with an edge connector of a first and second storage drive carrier module, respectively, each carrier module including a removable storage drive. The first and second carrier module interfaces 112 and 114 may engage with the respective edge connectors of the storage drive carrier modules such that the carrier module interfaces 112 and 114 facilitate electrical communication between the respective storage drives within the first and second storage drive carrier modules 112 and 114 and the adapter board 110. In some implementations, the first and second storage drive carrier modules each include a solid state storage drive disposed within the carrier modules. In further implementations, the first and second carrier modules each include a Next Generation Form Factor (NGFF) solid state storage drive.

In some implementations, the carrier module interfaces 112 and 114 may engage with multiple pins of the respective edge connector of the first and second carrier modules. In some implementations, the multiple pins may include multiple signal pins, at least one power pin and at least one ground pin. Further, in some implementations, the first and second carrier module interfaces 112 and 114 are to engage with the first and second carrier modules such that the edge connector of each carrier module can be directly inserted into the respective carrier module interface, without the need to tilt the edge connector relative to the carrier module interface in order to engage the multiple pins with the carrier module interface.

Referring still to FIG. 1, the adapter board 110 may further include a dual ported storage drive connector 116. In some implementations, the dual ported storage drive connector 116 may be disposed on the adapter board 110. The dual ported storage drive connector 116 may be an electrical interface to removably engage with a complementary storage drive bay interface. The dual ported storage drive connector 116, in some implementations, may be an edge connector with a plurality of pins. The plurality of pins may include signal pins and may further include at least one power pin. The dual ported storage drive connector may be a male connector to interface with a socket or female connector. In some implementations, the dual ported storage drive connector may be a dual ported SAS edge connector. In further implementations the dual ported storage drive connector may be a SFF-8482 dual ported SAS connector.

The dual ported storage drive connector 116 may engage with a complementary storage drive bay interface such that the dual ported storage drive connector 116 receives an electrical signal from the complementary storage drive bay interface and/or provides an electrical signal to the complementary storage drive bay interface. The dual ported storage drive connector 116 may receive an electrical signal from the complementary storage drive bay interface through signal pins on the dual ported storage drive connector 116. Similarly, in some implementations, the dual ported storage drive connector 116 may provide an electrical signal to the complementary storage drive bay interface through signal pins on the dual ported storage drive connector 116. In some implementations, the dual ported storage drive connector 116 may receive a power input from the complementary storage drive bay interface. Further, the dual ported storage drive connector 116 may receive a power input from the complementary storage drive bay interface through at least one power pin on the dual ported storage drive connector 116. The dual ported storage drive connector 116 may, additionally, provide the power input to each of the first and second carrier module interfaces 112 and 114 through the adapter board 110, via a conductive pathway.

As shown in FIG. 1, the dual ported storage drive connector 116 may further include a first port 117, shown in phantom, and a second port 118. The first port 117 may be on the reverse side of the dual ported storage drive connector 116 from the second port 118. The first port 117 may be a conductive pathway between the adapter board 110 and the dual ported storage drive connector 116. Similarly, the second port 118 may be a separate conductive pathway between the adapter board 110 and the dual ported storage drive connector 116. The adapter board 110 may provide a signal path between the first port 117 and the first carrier module interface 112 such that the first port 117 and the first carrier module interface 112 are in electrical communication. Similarly, the adapter board 110 may provide a signal path between the second port 118 and the second carrier module interface 114 such that the second port 118 and the second carrier module interface 114 are in electrical communication.

Further, the first and second port 117 and 118, respectively, may each comprise multiple signal pins on the dual ported storage drive connector 116 to engage with the complementary storage drive bay interface such that the complementary storage drive bay interface can electrically communicate with the first and second port 117 and 118 independently from each other. The adapter board 110 may, further, facilitate electrical communication between the complementary storage drive bay interface and each of the first and second storage drive carrier modules. The complementary storage drive bay interface may electrically communicate with the first and second carrier module interfaces 112 and 114 through a first signal path and a second signal path provided by the adapter board 110 and the first and second ports 117 and 118, respectively. The complementary storage drive bay interface may, thus, electrically communicate with the first and second carrier modules independently from each other, through the first and second signal paths, respectively.

The adapter board 110 may, therefore, allow the removal of one of the first and second storage drive carrier modules from electrical communication with the respective carrier module interface without interrupting electrical communication between another of the first and second storage drive carrier modules and the complementary storage drive bay interface. The complementary storage drive bay interface may continue electrical communication with the first storage drive carrier module through the first signal path via the first port 117 and the first carrier module interface 112 if the second storage drive carrier module is removed from electrical communication with the second carrier module interface 114. Similarly, if the first storage drive carrier module is removed from electrical communication with the first carrier module interface 112, the complementary storage drive bay interface may continue electrical communication with the second storage drive carrier module through the second signal path via the second port 118 and the second carrier module interface 114.

Figure 2A:
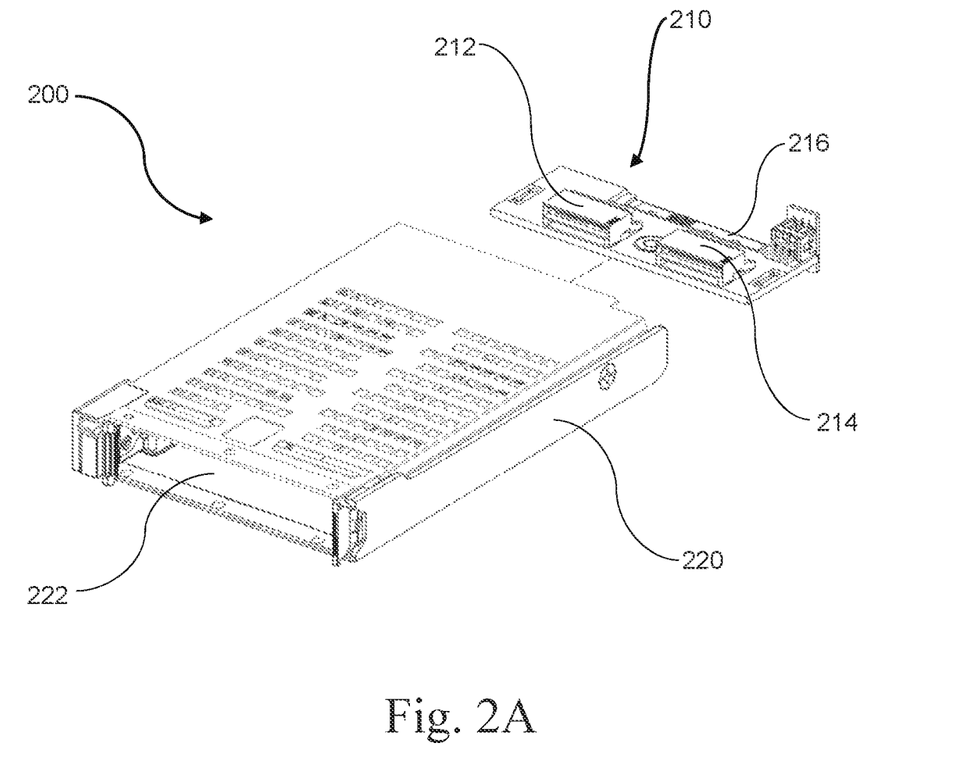
FIG. 2A is an exploded view of an example storage drive adapter including an adapter housing.

Referring now to FIG. 2A, an example storage drive adapter 200 is illustrated. In some implementations, the storage drive adapter 200 may include an adapter board 210, the adapter board 210 including first and second storage drive carrier module interfaces 212 and 214, respectively, and a dual ported storage drive connector 216, all as described above. The storage drive adapter 200 may further include an adapter housing 220.

Figure 2B:
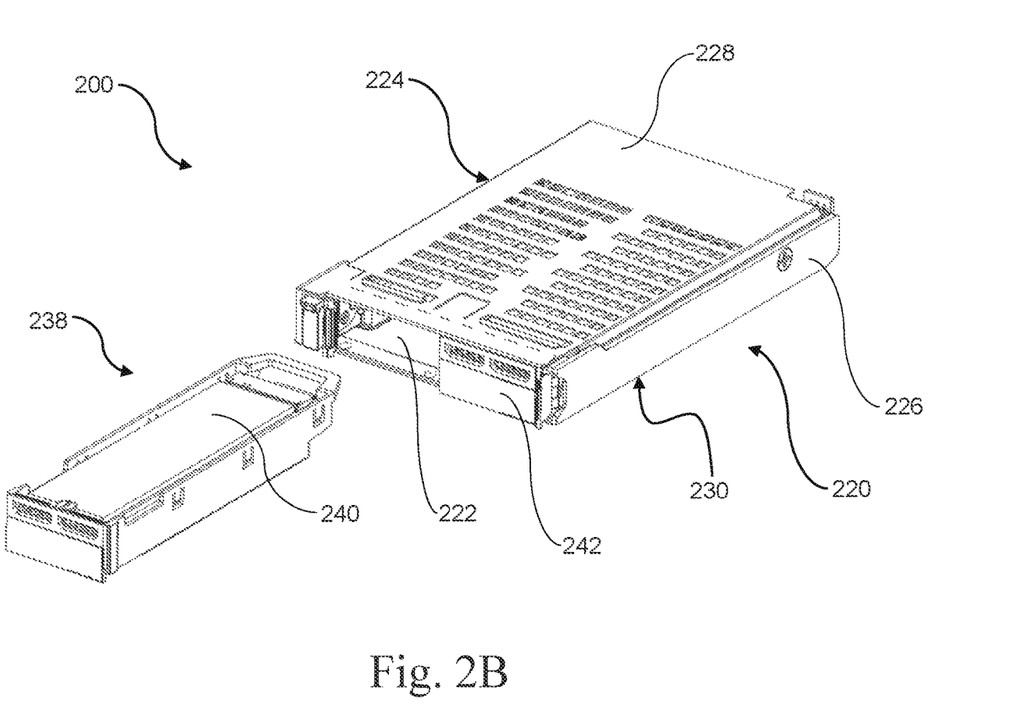
FIG. 2B is a perspective view of an example storage drive adapter engaged with a carrier module.

FIG. 2B is a perspective view of the example storage drive adapter 200 in FIG. 2A positioned to engage with a first storage drive carrier module 238 and engaged with a second storage drive carrier module 242. The first and second storage drive carrier modules 238 and 242 may each include a removable storage drive 240, as described above. The adapter housing 220, as shown in FIG. 2B, may be a structural enclosure that wholly or partially encloses the elements of the storage drive adapter 200, including the adapter board 210. The adapter housing 220 may protect the elements of the storage drive adapter 200 from damage or mechanical or electrical interference with their function. In some implementations, the adapter housing 220 may protect the elements of the storage drive adapter 200 from static interference. Further, the adapter housing 220 may receive the first and second storage drive carrier modules 238 and 242 within the adapter housing 220.

The adapter housing 220 may facilitate removable insertion of the storage drive adapter 200 into a receiving computer system, including a server system. In some implementations, the adapter housing 220 may facilitate the insertion of the storage drive adapter 200 into a storage drive bay in the receiving computer system such that the adapter housing 220 is removably engaged with the storage drive bay. In yet further implementations, the adapter housing 220 may facilitate direct removable insertion of the dual ported storage drive connector 216 into a complementary storage drive bay interface enclosed within the storage drive bay of the receiving computer system. In some implementations, the storage drive bay is a hard drive bay in the receiving computer system. In further implementations, the storage drive bay may be a Small Form Factor (SFF) hard drive bay in the receiving computer system.

The adapter housing 220, in some implementations, may include a first side portion 224, a second side portion 226, a top cover 228, and a bottom portion 230, as shown in FIG. 2B. The first and second side portions 224 and 226 may be substantially flat and parallel to each other. The first and second side portions 224 and 226 may further be substantially perpendicular to the top cover 228 and the bottom portion 230. The top cover 228 and the bottom portion 230 may be substantially parallel to one another, and may also be substantially flat.

The adapter housing 220 may include an opening 222, as illustrated in FIGS. 2A and 2B. The opening 222 may be defined by the first and second side portions 224 and 226, the top cover 228, and the bottom portion 230. In some implementations, the opening is disposed between the first and second side portions 224 and 226 and between the bottom portion 230 and the top cover 228 such that the adapter housing allows individual removal of each of the first and second storage drive carrier modules 238 and 242 from the opening while the adapter housing is engaged with the storage drive bay. In further implementations, the adapter board 210, including the first and second carrier module interfaces 212 and 214, may be disposed within the adapter housing 220 at an opposite end from the opening 222. In some implementations, the adapter housing 220 may receive the first storage drive carrier module 238 and the second storage drive carrier module 242 within the opening 222, the latter as illustrated in FIG. 2B, such that the first and second storage drive carrier modules 238 and 242 are wholly or partially disposed within the adapter housing 220 and are engaged with the first and second carrier module interfaces 212 and 214, respectively, of the adapter board 210. The opening 222 may align the first and second storage drive carrier modules 238 and 242 for removable electrical engagement with the first and second carrier module interfaces 212 and 214, respectively. In further implementations, the adapter housing 220 may receive the first and second storage drive carrier modules 238 and 242 laterally adjacently to each other within the opening 222, as shown in FIG. 2B.

The adapter housing 220 may receive the first and second storage drive carrier modules 238 and 242 such that the first storage drive carrier module 238 can be disengaged from the first storage drive carrier module interface 212 and removed from the adapter housing 220 through the opening 222 while the second storage drive carrier module 242 remains disposed within the adapter housing 220 and engaged with the second storage drive carrier module interface 214. Similarly, the second storage drive carrier module 242 can be disengaged from the second storage drive carrier module interface 214 and removed from the adapter housing 220 through the opening 222 while the first storage drive carrier module 238 remains disposed within the adapter housing 220 and engaged with the first storage drive carrier module interface 212. In further implementations, the adapter housing 220 may allow individual removal of each of the first and second storage drive carrier modules 238 and 242 from the opening 222, as described above, while the adapter housing 220 is electrically and mechanically engaged with the storage drive bay. In other words, each of the first and second storage drive carrier modules 238 and 242 are individually hot pluggable into the storage drive bay.

Figure 3A:
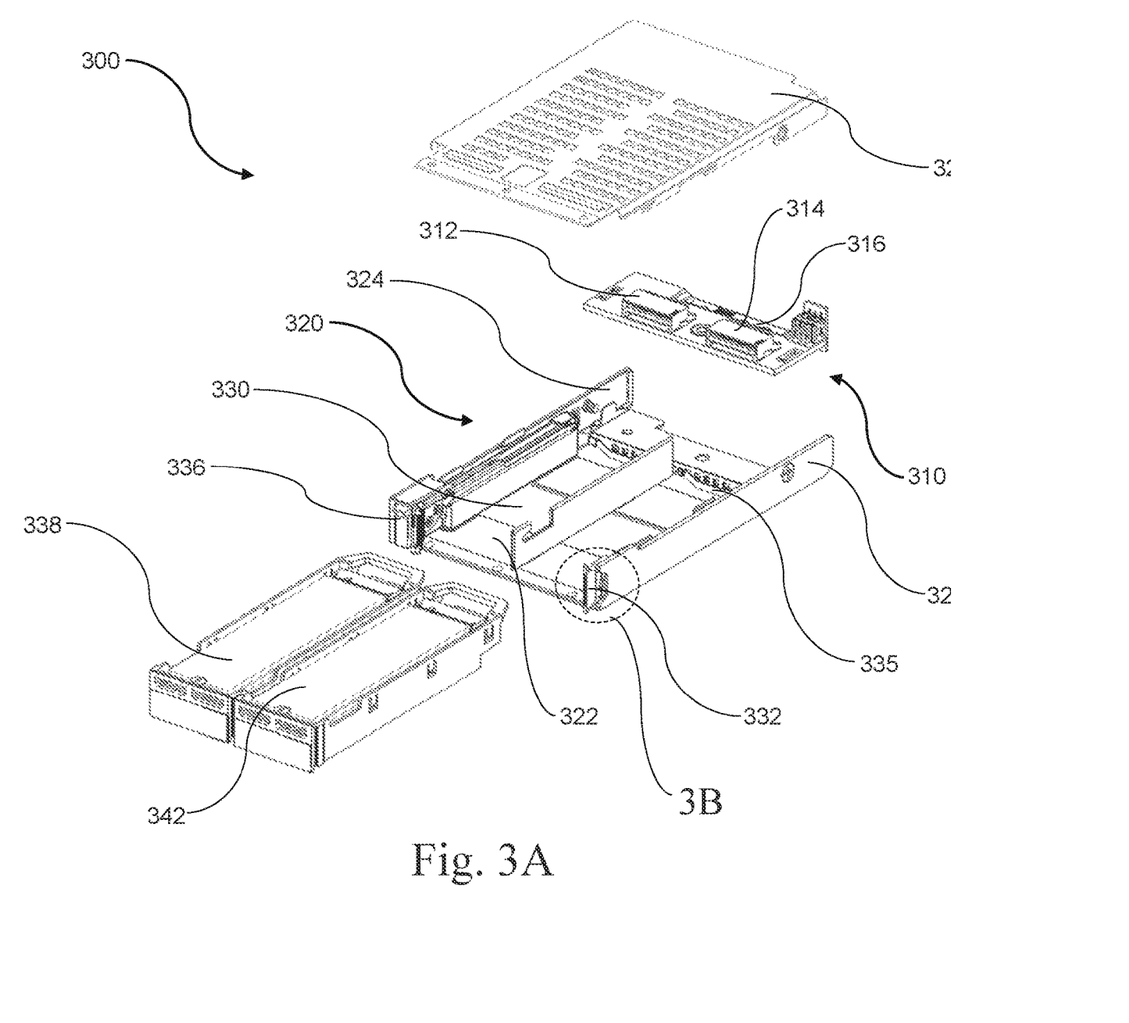
FIG. 3A is an exploded view of an example storage drive adapter including a carrier module retention mechanism, a carrier module ejection mechanism, and an adapter ejection mechanism.

Referring now to FIG. 3A, an exploded view of a further example storage drive adapter 300 is illustrated. In some implementations, the storage drive adapter 300 may include an adapter board 310, the adapter board 310 including first and second storage drive carrier module interfaces 312 and 314, respectively, a dual ported storage drive connector 316, and an adapter housing 320 as described above. The storage drive adapter 300 may further include a carrier module retention mechanism 332, a carrier module ejection mechanism 335, and an adapter ejection mechanism 336. It should be noted that, while the carrier module retention mechanism 332, the carrier module ejection mechanism 335, and the adapter ejection mechanism 336 are shown together in FIG. 3A, implementations of the present disclosure do not need to include all of them.

Figure 3B:
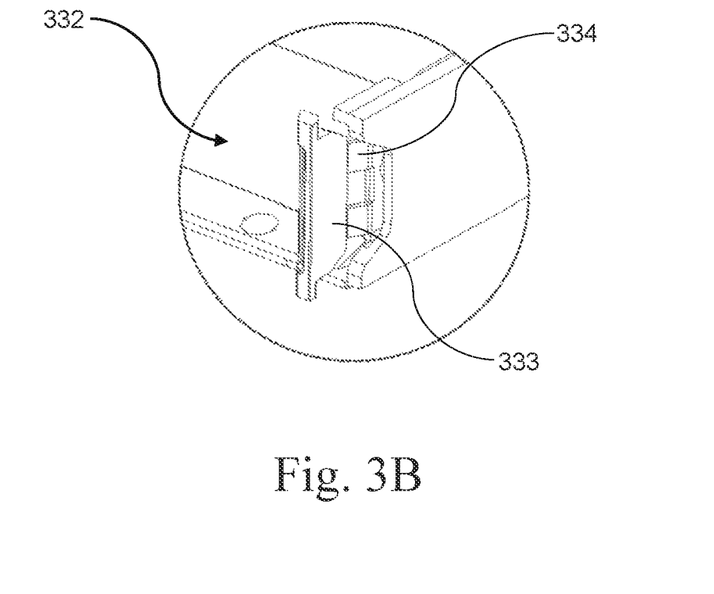
FIG. 3B is a detail view of an example storage drive adapter including a carrier module retention mechanism.

In some implementations, the storage drive adapter 300 may further include a carrier module retention mechanism 332. The carrier module retention mechanism 332 may be a mechanism engaged with the adapter housing 320 and each of the first and second storage drive carrier modules 338 and 342 to retain each of the first and second storage drive carrier modules 338 and 342 within the adapter housing 320. FIG. 3B is a detail view of an example carrier module retention mechanism 332. The carrier module retention mechanism 332 may include at least one retention latch 333 and at least one bias member 334. The carrier module retention mechanism 332 may include at least one retention latch 333 to engage with each of the first and second storage drive carrier modules 338 and 342. In some implementations, the carrier module retention mechanism may include a bias member 334 to urge each of the retention latches 333 into an engaged position with at least one of the first and second storage drive carrier modules 338 and 342. Each bias member may be removably engaged with at least one of the first and second storage drive carrier modules 338 and 342, such that the engaged storage drive carrier module is retained within the adapter housing 320 when in the engaged position with the retention latch 333. Further, each retention latch 333 may be removed from the engaged position with at least one of the first and second storage drive carrier modules 338 and 342 by having a counteracting force act on the retention latch 333 in a direction that is substantially opposite to the urging of the bias member 334. In some implementations, each bias member 334 may be a spring, or further, a leaf spring.

The storage drive adapter 300 may also include a carrier module ejection mechanism 335. The carrier module ejection mechanism 335 may be a mechanism engaged with the adapter housing 320 and each of the first and second storage drive carrier modules 338 and 342 to eject each of the first and second storage drive carrier modules 338 and 342 from the adapter housing 320. In some implementations, the carrier module ejection mechanism 335 may eject each of the first and second storage drive carrier modules 338 and 342 upon release of the carrier module retention mechanism 332. In some implementations, the carrier module ejection mechanism 335 may fully or partially eject one of the first and second storage drive carrier modules 338 and 342 from the adapter housing 320 upon removal of the retention latch of the corresponding carrier module retention mechanism 332 from the engaged position with the storage drive carrier module. In further implementations, the carrier module ejection mechanism 332 may comprise a bias member. The bias member may exert an ejection force on at least one of the first and second storage drive carrier modules 338 and 342. In further implementations, the ejection force of the bias member may fully or partially eject the storage drive carrier module from the adapter housing 320 upon removal of the retention latch of the corresponding carrier module retention mechanism 332 from the engaged position with the storage drive carrier module. In some implementations, the bias member may be one or more springs, or further, one or more leaf springs.

The storage drive adapter 300 may also include an adapter ejection mechanism 336. The adapter ejection mechanism 336 may be a mechanism engaged with the adapter housing 320 to retain the storage drive adapter 300 within the receiving computer system, or a storage drive bay therein, and/or to eject or facilitate the ejection of the storage drive adapter 300 from the receiving computer system, or a storage drive bay therein, upon activation of the adapter ejection mechanism 336. Activation of the adapter ejection mechanism 336 may include pulling a protruding member of the adapter ejection mechanism 336 to enable the adapter housing 320 to be pulled from the receiving computer system. In some implementations, activation of the adapter ejection mechanism 336 may include pushing a portion of the adapter ejection mechanism 336, thereby causing the portion to protrude from the adapter ejection mechanism 336 and be pulled, enabling the adapter housing 320 to be pulled from the receiving computer system. In some implementations, the adapter ejection mechanism 336 may cease to retain the storage drive adapter 300 within the receiving computer system upon activation of the adapter ejection mechanism 336, thereby allowing the storage drive adapter 300 to be ejected, removed, or pulled from the receiving computer system. Further, the adapter ejection mechanism 336 may be structurally integrated with the adapter housing, or, in some implementations, with the first or second side portions 324 or 326, as seen in FIG. 3. In some implementations, the adapter ejection mechanism 336 may facilitate the retention and ejection of the storage drive adapter 300 in and from a hard drive bay, or, more specifically, a SFF hard drive bay.

What is claimed is:

1. A method for a storage drive adapter, the method comprising:
   engaging an adapter housing of the storage drive adapter with a storage drive bay containing a complementary storage drive bay interface;
   aligning a first storage drive carrier module into an opening of the adapter housing such that the first storage drive carrier module electrically engages with a first carrier module interface of the storage drive adapter;
   aligning a second storage drive carrier module into the opening of the adapter housing such that the second storage drive carrier module electrically engages with a second carrier module interface of the storage drive adapter, wherein the storage drive adapter comprises:
   an adapter board enclosed in the adapter housing;
   the first carrier module interface on the adapter board;
   a second carrier module interface on the adapter board;
   a dual ported storage driver connector on the adapter board to engage with the complementary storage drive bay interface, the dual ported storage drive connector to receive a power input from the complementary storage drive bay interface and to provide the power input to each of the first and second carrier module interfaces, the dual ported storage drive connector including:
      a first port to provide a signal path from the complementary storage drive bay interface to the first carrier module interface;
      a second port to provide a signal path from the complementary storage drive bay interface to the second carrier module interface; and
   removing the first storage drive carrier module from the adapter housing while keeping the adapter housing engaged with the storage drive bay and the second storage drive carrier module electrically engaged with the second carrier module interface.

2. The method of claim 1, wherein the second drive module is aligned into the opening laterally adjacent to the first carrier drive module.

3. The method of claim 1, wherein the storage drive bay is a Small Form Factor (SFF) storage drive bay.

4. The method of claim 1, wherein the first and second storage drive carrier modules each include a solid state storage drive disposed within the carrier modules.

5. The method of claim 1, wherein the dual ported storage drive connector is a dual ported Serial Attached SCSI (SAS) connector.

6. The method of claim 1, wherein the storage drive adapter comprises a carrier module retention mechanism to engage each of the first and second storage driver carrier modules within the adapter housing.

7. The method of claim 1, wherein the storage drive adapter comprises a carrier module ejection mechanism to remove the first storage driver carrier module from the adapter housing.

* * * * *